United States Patent Office 3,030,026
Patented Apr. 17, 1962

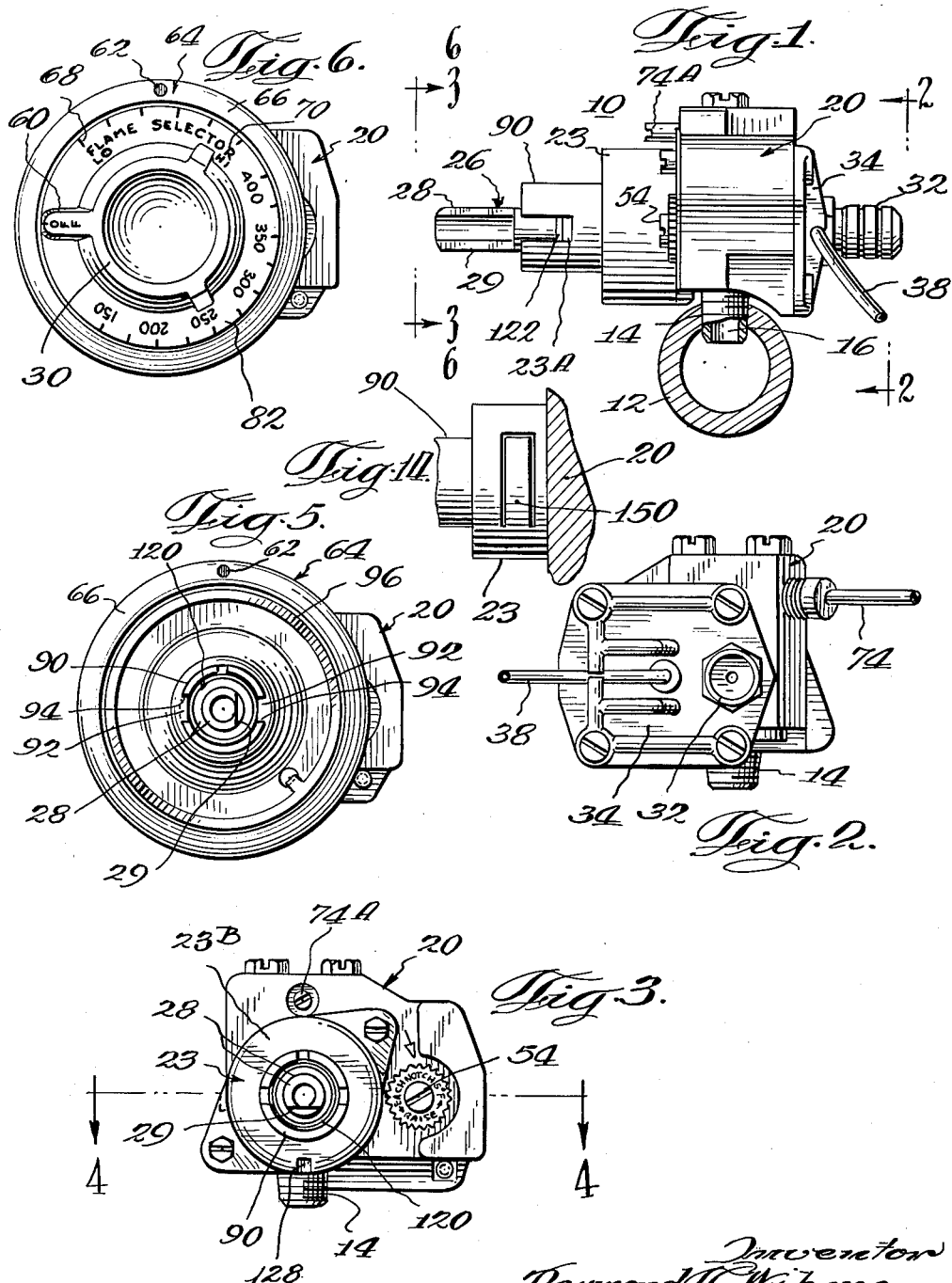

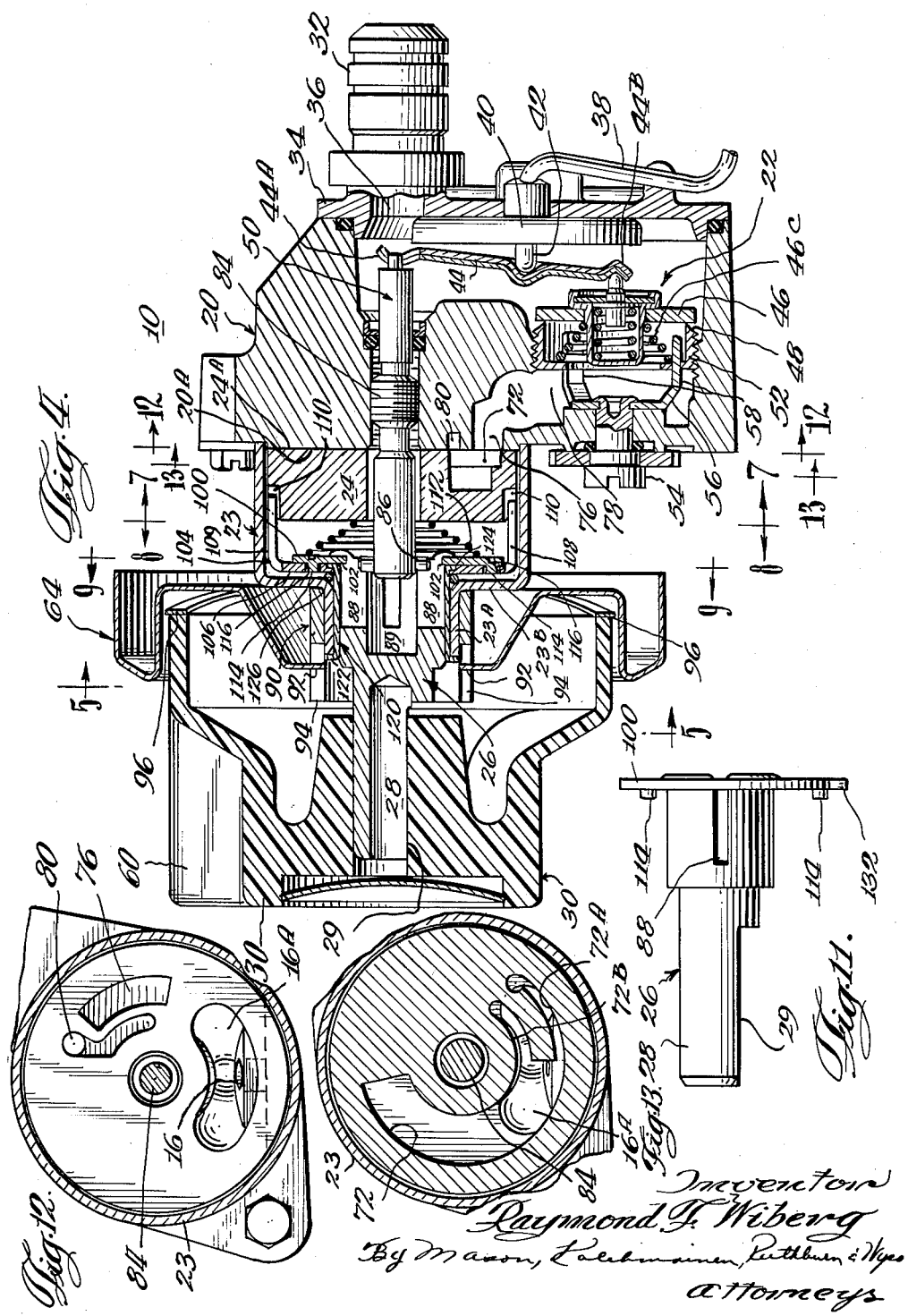

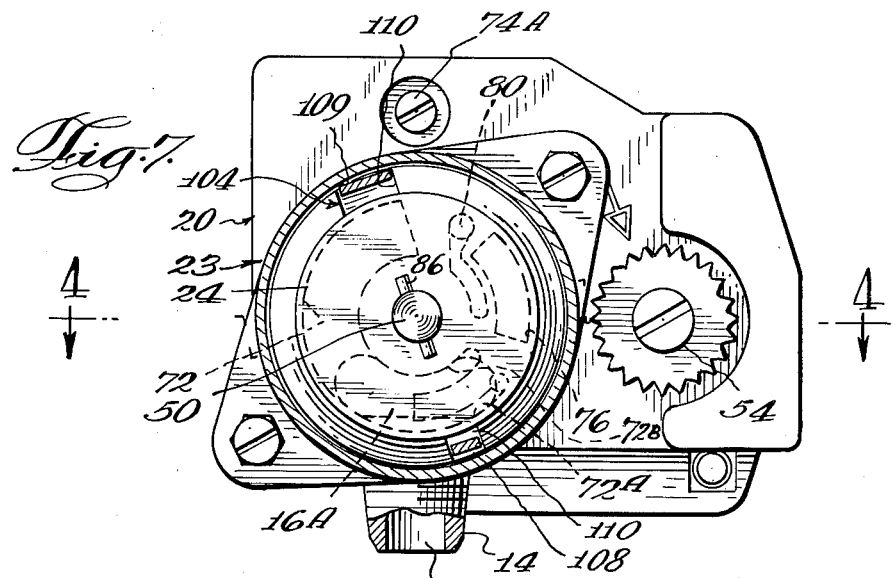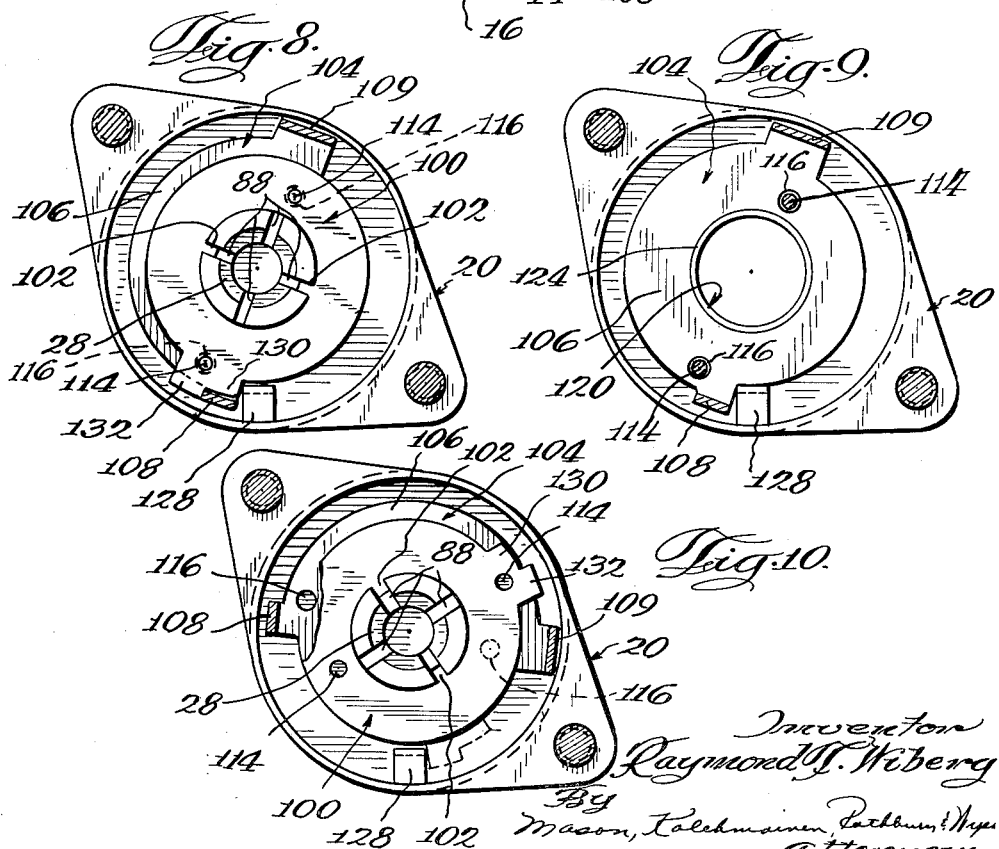

3,030,026
THERMOSTATIC GAS VALVE
Raymond F. Wiberg, Crete, Ill., assignor to Harper-Wyman Company, Chicago, Ill., a corporation of Illinois
Filed June 2, 1959, Ser. No. 817,519
16 Claims. (Cl. 236—99)

The present invention relates to gas valves and has for its primary object the provision of a new and improved thermostatic gas valve.

Another object of the present invention is to provide an improved and simplified thermostatic gas valve including means whereby the user may select a desired height of flame which is then thermostatically controlled in order to maintain a desired temperature in the controlled device, such as a cooking vessel placed above a top burner.

A still further object of the invention is to provide a thermostatic gas valve with new and improved valve element operating means cooperatively associated with thermostatic control means whereby a simplified single control for the valve element and thermostatic means are provided to enable the thermostatic control means to control the supply of gas flowing through the valve irrespective of the position of the valve element and the selected height of flame.

Another object of the present invention is to provide a new and improved thermostatic valve with flame selector means so constructed and arranged in which the porting and thermostatic control are so constructed and arranged that the flame selection is effectively made in a first range of movement from off and the temperature selection in a second range effectively beyond the first and the temperature selection is in a decreasing direction from high temperature so that the valve is effectively a manual valve at low flow of gas for low flame settings.

Another object of the present invention is to provide a new and improved thermostatic valve having a single manually operable means for rotating a gas flow controlling valve element and setting the temperature of an associated thermostatically controlled valve including disengageable clutch means provided between the valve element and manually operable means and having also braking means minimizing undesired movement of the valve element after declutching and during subsequent operation of the manually operable means to adjust the temperature setting.

In brief, the valve of the present invention comprises a manually operable between off and full on positions and operable to various positions between these limit positions to determine the rate of flow of gas to a burner. Different settings of the valve will thus provide different flame heights at the burner. The valve includes also a thermostatically controlled valve regulating the thus selected gas flow to the burner, thereby to maintain a desired temperature as of a cooking vessel placed above the burner. The rotary valve element and thermostatic means are controlled as by a single handle and a stem assembly rotatable thereby. The stem assembly is both rotatable and axially movable. It is permanently connected to the thermostatic control means but is adapted selectively to be connected to or disengaged from the rotary valve elment. This enables the handle to be moved to operate the rotatable valve element to provide a desired flame height. Thereafter the handle can be disengaged from the rotatable valve element actuating means and further rotated to select a desired temperature to be maintained by the thermostatic valve. The arrangement is such that the handle can be disengaged from the rotary valve element actuating means when desired. When so disengaged, undesired movement of the valve element upon subsequent movement of the handle for temperature adjustment purposes is minimized by braking means engaging the periphery of the disc. It is also such that when it is desired to shut off the flow of gas by turning the handle to off position, the rotary valve disc is reengaged and can be moved to its off position. The valve porting is so arranged that as the valve handle is moved in a first range of movement from off toward full on or high a greater flow of gas is effected. Continued movement of the valve handle in a second range of movement beyond the first in the same direction results in lowering of the temperature to be maintained. As a result, the valve can be set for a low flame which is not normally thermostatically controlled because the low flame will generally not produce sufficient heat to raise the temperature of the cooking vessel to the high temperature, except under abnormal conditions.

Other objects and advantages of the present invention will become apparent from the ensuing description of an illustrative embodiment thereof, in the course of which reference is had to the accompanying drawings, in which:

FIGURE 1 is a side elevational view of a valve constructed in accordance with the present invention in an intermediate on position and with the valve and thermostat actuating handle omitted;

FIGURE 2 is an end elevational view looking in the direction of the line 2—2 of FIGURE 1;

FIGURE 3 is a front elevational view taken along the line 6—6 of FIGURE 1, but illustrating the valve in its off position;

FIGURE 4 is an enlarged axial horizontal cross section view taken along the line 4—4 of FIGURE 3 and 4—4 of FIGURE 7 and showing the valve in an intermediate on position;

FIGURE 5 is an end elevational view taken along line 5—5 of FIGURE 4, but with the handle omitted;

FIGURE 6 is a front elevational view of the valve of FIGURE 1 looking in the direction of line 3—3 of that figure and showing the handle, which is not shown in FIGURE 1, in an intermedaite on position;

FIGURE 7 is a transverse cross sectional view taken along the line 7—7 of FIGURE 4 but with the valve in its off position;

FIGURE 8 is a similar cross-sectional view taken along line 8—8 of FIGURE 4 with the valve in its off position, but with the rotor valve housing omitted;

FIGURE 9 is a transverse cross sectional view taken along line 9—9 of FIGURE 4 with the valve in its off position and with the valve stem assembly omitted;

FIGURE 10 is a view similar to FIGURE 8, partly broken away, corresponding to a different position of the valve, one that is an intermediate position of the flame selector and an intermediate temperature setting;

FIGURE 11 is an enlarged plan view of a stem assembly utilized in the valve;

FIGURE 12 is a view on a reduced scale along line 12—12 of FIGURE 4 illustrating the porting on the valve body;

FIGURE 13 is a view along the line 13—13 of FIGURE 4 illustrating the porting on the rotatable valve member in its off position; and FIGURE 14 is a fragmentary view showing a form of braking means provided to minimize undesired movement of the rotatable flow control element after the operating means has been declutched from it and is connected to the temperature adjusting means.

Referring now to the drawings, and first to FIGURES 1 to 6, the valve of the present invention is indicated as a whole by reference character 10. It is adapted to be mounted upon and to be supplied with gas from a gas supply manifold 12, the mounting being effected by an externally threaded dependent nipple 14 within which is a gas inlet passageway 16 having a horizontal branch with an arcuate opening 16A on the front face 20A of the valve body 20 (see FIGURES 7 and 12). The valve includes, in the main, the body portion 20 within which is mounted thermostatically actuated control means 22, which will be described hereinafter. The front of the body has attached to it a housing or casing 23, within which is mounted a rotary valve element 24, see FIGURE 4, adapted to be actuated through a stem assembly 26 including a stem 28 having a flat 29 at its outer end to which is attached an operating handle 30, the flat facing down, as shown in FIGURE 3, in the off position of the valve. The handle 30 is rotatable to select a desired height of flame by rotating the valve element 24 to a desired position. The handle is also rotatable independently of the rotation of the valve element in order to predetermine the temperature of a cooking vessel to be maintained by the control with the selected height of flame.

Gas from the valve is discharged through an outlet hood or nozzle 32 attached to a closure plate 34 which is apertured to provide an outlet passageway 36. The gas discharged from the nozzle 32 is supplied in a conventional manner, as through a venturi to a burner, not shown. Associated with the burner is a temperature sensing unit, also not shown, adapted to engage the bottom of a cooking vessel placed over the burner. The sensing element is connected as through an capillary tube 38 to an axially expansible actuating or power element 40 forming part of the thermostatic control means 22 and provided with a projection 42 which is moved transversely, see FIGURE 4, to shift the position of a valve controlling lever 44, end 44B of which is connected to a regulating valve 46 movable against bias spring 46C relative to a valve seat 48 and the other end of which is connected to an axially movable element 50 adapted to be manually adjusted axially of its length through the handle 30 and the stem assembly 26 for temperature selection. The lever 44 is made of bimetallic material to provide ambient temperature compensation.

Calibration of the thermostatic control is effected by adjustment of the axial portion of the valve seat 48 formed at the end of tubular externally threaded element 52. This adjustment is effected by rotary control element 54 accessible from the exterior of the valve and connected to tubular element 52 by a forked coupling element 56 having spaced apart axially extending driving portions 58.

The desired height of flame may be selected through rotation of the valve handle 30 and the temperature to be maintained by the thermostatically actuated valve is also selected by rotation of the valve handle 30 to a desired angular position. Referring first to FIGURE 6, it may be noted that the handle is provided with a radial boss 60 marked "off" which is shown in a generally horizontal position, but which in the off position of the valve is in an upper vertical position and underneath an off position indicating dot 62 on an associated bezel 64 (see also FIG. 4) having an outer rim portion 66 surrounding the handle.

For flame selection the valve handle is turned counterclockwise from the off position to some intermediate position such as that illustrated in FIGURE 6, in which position an intermediate height of flame is obtained, the position being between a low flame position marking 68 and a high flame, full on position marking 70. Referring now to FIGURES 7, 12 and 13, it will be noted that a relatively large arcuate recess 72 is provided in the rotor disc 24 at its face 24A abutting against the face 20A of the valve body. The recess 72 has a first relatively narrow arcuate extension 72A which is provided for supplying the lower quantities of gas to the burner for low flame selection. A second narrow arcuate recess of uniform depth 72B is provided for supplying gas through conduit 74 (see FIG. 2) at a rate determined by an adjustable screw 74A (see FIGS. 3 and 7) as to a lighting tower (not shown), associated with a burner (not shown) through an outlet port 80 on the face 20A of the valve and suitably connected to a tower outlet passageway on the valve body (not shown), see FIGURE 2.

The flow to the main burner is through a passageway 76 at the face 20A of the valve body 20, it communicating with an outlet chamber 78 in which the valve seat element 52 is located. The passageway 72A is tapered along its length to provide a gradual change in gas flow as the valve disc is rotated in a counterclockwise direction from off toward full on. If desired, the lighting tower may be eliminated and the passageway 78 may be connected to bypass the regulating valve 46 to supply a minimum quantity of gas to outlet passageway 36 whenever the valve is turned off.

For flame selection, the valve handle and rotor disc 24 are turned in a counterclockwise direction from off position toward full on. In off position, the passageways 76 and 80 are both closed by the overlying face 24A of the valve disc. As the disc is rotated in a counterclockwise direction, the arcuate extension passageways 72A and 72B come into initial registry with passageways 76 and 80, thereby supplying a low quantity of gas to the outlet hood 32 through the thermostatic valve 22 and to the lighting tower through port 80 and associated passageways, not shown. Continued movement in a counterclockwise direction gradually increases the flow of gas to the outlet 32 through passageway 76 and the thermostatic valve until full registry is effected between passageways 72 and 76, as at the "Hi" indication 70 on on the valve handle.

One of the important features of the present invention resides in the flame selection and its correlation to the thermostatic control. Referring to FIGURE 6, it will be noted that the highest thermostatic settings are adjacent the high flame position and immediately following it. This arrangement is achieved by constructing the thermostatic valve regulating shaft 50 with the thread 84 properly oriented with the valve handle so that this mode of operation is effected. A result of it is that the lower the flame that is selected, the higher the temperature to be maintained. This means, effectively, that the valve is a manual valve at the low temperature settings because the gas supplied to the burner is not sufficient to heat the contents of a cooking vessel to a high temperature required for shutting off the flow of gas by the thermostatic valve 22. However, should the contents of the cooking vessel boil away and an abnormally high temperature be reached, the thermostatic valve will shut off the flow of gas to the burner.

The handle 30 is also rotatable to adjust the temperature to be maintained by the valve, the desired setting being indicated by the indicia 82, see FIGURE 6, which indicia also cooperates with the dot 62 on the bezel. The temperature setting is effected by changing the fulcrum point of the lever 44 operatively connected between the valve 46 and the axially movable regulating element 50. One end of the latter is connected as to the forked end 44A of the lever 44, see FIGURE 4. An intermediate portion of element 50 is externally threaded as indicated by the reference character 84 so that rotation of the element 50 effects its axial movement thereby to adjust the fulcrum point of the lever 44. The element or shaft 50 is connected to the valve stem as by a pin and slot connection comprising a pin 86 at the outer end of shaft 50 engageable in slots 88 at the inner end of the stem 28 which is provided with a bore 89 in order to permit relative axial movement between the stem and temperature regulating shaft 50.

The bezel 64 is slidably mounted upon a bezel mounting tube 90 fixedly mounted on a smaller diameter forwardly extending tubular portion 23A of the housing 23. The bezel is properly located and prevented from rotating relative to the valve by a tongue and slot construction consisting of the angularly spaced apart tongues 92 on the bezel 64 and the slots 94 on the mounting tube 90. The bezel is biased rearwardly by a concavo-convex spring 96.

The flame and temperature selection mechanism of the present invention includes a novel drive between the valve stem and the valve disc. This drive includes a drive washer 100 staked or otherwise fixedly secured to the inner end of the valve stem 28 and having a tongue and slot connection relative thereto provided by axial slots 88 (of which there are four) and the washer tongues 102 (see FIGURE 4) extending a short distance into the slots, thereby effectively to couple the drive washer and stem together. The drive washer 100 is adapted selectively to be coupled to the rotary valve disk 24 through a drive yoke 104 having a circular disc-like portion 106 and a pair of axially extending drive fingers 108 and 109 engaged in external peripheral recesses 110 on the valve disc. The stem assembly including the drive washer 100 is axially movable against the bias of a spring 112 disposed in the casing 23 between the valve disc 24 and the drive washer 100. The arrangement is thus such that the spring holds the valve disc in engagement with the valve body and biases the drive washer 100 against the central circular portion 106 of the drive yoke.

In the position indicated in FIGURE 4, the drive washer 100 is in driving relation with the yoke 104, this relation being provided by two opposed forwardly extending drive projections 114 on the washer extending into the two recesses or openings in the central portion 106 of the drive yoke 104. Thus, as long as the parts are in the relation shown in FIGURE 4, the valve handle and stem are coupled to the valve disc 24. To uncouple them, the valve handle 30 is moved inwardly thereby to move the drive washer 100 axially inwardly against the force of the spring 112, thereby to disengage the drive fingers 114 from the openings 116. Thereafter, the stem assembly can be turned to rotate the drive disc so as to move the fingers 114 out of registry with the drive yoke, the drive yoke being held stationary by friction exerted upon it in a manner to be described shortly.

When the drive disc is uncoupled from the drive yoke, rotation of the valve handle does not turn the disc but the thermostatic regulating means is operated through the axially extending shaft 50 which, as heretofore described, changes the fulcrum point of the lever 44.

Undesired rotation of the valve disc when the stem assembly is uncoupled therefrom is prevented by friction braking means which may take various forms of which one form is shown in FIG. 14 while that illustrated in the embodiment of FIGS. 1 to 13 is of a type disclosed and claimed in the copending application of Norman J. Huff, Serial No. 817,518, filed contemporaneously herewith and assigned to the assignee of this application. In brief, it includes a tubular sleeve 120 surrounding the inner portion of the valve stem 28 and constituting a bearing rotatably supporting the stem assembly. The sleeve 120 is fixedly secured to an axial forwardly extending flange portion 23A of the casing. Sleeve 120 has at its forward end a peripheral outwardly extending flange 122 abutting against the front end of the portion 23A of the casing. It has a second flange 124 at its inner end spaced some distance inwardly from the transverse portion 23B of the casing 23 and abutting against a counterbore at the inner region of the central portion 106 of the drive coupling and supporting the drive coupling 106 for rotation therearound. The portion 106 of the drive yoke is spaced somewhat from the casing and into this space is placed a concavo-convex ring 126 bearing against the portion 106 and the interior of the casing, thereby to apply a frictional force against the drive yoke preventing it from being rotated by frictional forces imparted to it from the stem assembly after the stem assembly has been uncoupled therefrom.

The braking arrangement of FIG. 14 is of a somewhat different form, particularly in that the braking means acts directly on the rotor disc element 24. As illustrated, the braking is provided by a plurality of tongues or fingers 150 formed integrally by portions of the casing 23 and which are bent inwardly frictionally to engage the periphery of the disc. While only one tongue is shown in FIG. 14, a plurality, such as two diametrically opposed or three evenly spaced tongues, should be used to provide balanced forces on the disc.

The driving arrangement between the valve stem assembly and the disc drive yoke is such that the two can be uncoupled at any desired position of the disc thereby to enable the height of the flame to be adjusted as desired. The valve disc is movable substantially 135 degrees between its off and full on positions. These positions are indicated and determined by engagement of one or the other of the drive fingers 108 and 109 with an indented projection 128 of the casing. The off position is determined by engagement of projection 108 with the projection 128 as shown in FIGURE 8. The full on position is determined by engagement of the abutment 109 with the opposite side of projection 128. The drive washer is also provided with an abutment 130 for substantially engaging the projection 128 in the off position. Immediately adjacent the abutment 130 is a somewhat longer radially extending abutment 132 engageable with the drive finger 108 in order to insure return of the valve disc from any open position to its closed position as the handle is returned to its off position. Thus, even though the projections 114 on the drive washer 100 are not in the openings 116 of the drive yoke 104, as might be the case if the drive handle 30 is depressed inwardly, rotation of the handle to its off position will return the valve disc 30 to its off position.

In operation, the valve disc will normally be in its off position. In order to supply gas to a burner, the valve handle is turned counterclockwise from its off position to select a desired height of flame. As indicated in FIGURE 6, some intermediate height of flame may be selected. During this time the handle 30 remains axially in the position of FIGURE 4, to which it and the stem assembly are biased by the spring 112, thereby to couple the valve stem to valve disc 24. As shown, the stem assembly, including the drive washer 100, are drivingly connected to the rotary disc valve 24 through the yoke 104 by means of the drive finger 114 in the drive disc and apertures 116 in the yoke. After the desired flame height has been selected, the handle 30 is moved inwardly thereby to uncouple the drive disc from the drive yoke. Thereafter, the handle is turned further in a counter-clockwise direction to select the temperature to be maintained, as shown in FIGURE 10. During operation, the temperature setting may be varied in either direction simply by rotating the valve handle. When it is desired to turn the valve off, the handle 30 is moved in a clockwise direction. When the temperature setting is varied, the valve disc is prevented from rotation by the friction of braking applied thereto through the spring 126.

When it is desired to return the valve to its off position, the handle is turned in a clockwise direction. In the event that the handle is not prevented from moving axially outwardly, the drive projection 114 will enter the openings 116 when the valve stem 28 moves to a position to align the fingers with the openings. At this time the spring 112 moves the stem assembly to recouple the stem assembly to the drive yoke. However, should the user prevent the handle from being moved outwardly by the spring 112, the projection 132 on the drive disc 106 will engage the drive yoke to insure return of the drive yoke and the valve disc to the off position.

As previously noted, the porting in the valve body and rotary disc are such that there is effectively provided a first range of movement of the handle nad valve disc in which the size of flame may be selected. This is followed effectively by a second range of movement wherein the temperature to be maintained is selected. The arrangement, furthermore, is such that the high end of the temperature scale is adjacent the full on or high end of the flame selection range. This simplifies construction and operation and reduces the required amount of rotation of the valve handle and disc and also insures that for low flame settings the thermostatic control will be operative to control flow of gas only under abnormal conditions encountered as when the contents of a cooking vessel boil away. Perhaps it should be mentioned that the valve handle is connected to the thermostat adjusting means at all times but that the temperature adjustment at the low flame settings is so high that the thermostatic means is not normally operative. The result is the effective two range operation mentioned.

While the present invention has been described in connection with the details of illustrated embodiments thereof, these details are not intended to be limited to the illustrated embodiments except as set forth in the accompanying claims.

What is claimed as new and is desired to be secured by Letters Patent of the United States is:

1. A thermostatic gas valve including a rotatable gas flow controlling control element, a thermostatically actuated valve, said element and valve being serially connected for gas flow and the valve being downstream of the element, and means including manually operable means movable over a first range of movement for operating said control element between normal off and full on positions and movable over a second range of movement for adjusting in a predetermined range the temperature to be maintained by said thermostatically actuated valve, and means for limiting the movement of the control element only to said first range and the higher temperature end of said predetermined range being adjacent the full on position.

2. A thermostatic gas valve including a rotatable gas flow controlling control element, a thermostatically actuated valve, said element and valve being serially connected for gas flow and the valve being downstream of the element, and means including manually operable means movable over a first range of movement for operating said control element only over a first range of movement and said operable means being movable over a second range of movement for adjusting in a predetermined range the temperature to be maintained by said thermostatically actuated valve, the higher temperature end of said predetermined range being adjacent said first range.

3. A thermostatic gas valve including a rotatable gas flow controlling control element, a thermostatically actuated valve, said element and valve being serially connected for gas flow and the valve being downstream of the element, means including manually operable means movable in a predetermined direction for operating said control element between off and full on positions and for adjusting the temperature to be maintained by said thermostatically actuated valve from a higher to a lower value in a range having its higher temperature value adjacent the full on position, and means for preventing movement of said control element beyond full on position.

4. A thermostatic gas valve including a rotatable gas flow controlling control element, a thermostatically actuated valve, said element and valve being serially connected for gas flow and the valve being downstream of the element, means for adjusting the setting of said valve, means including manually operable means movable in a predetermined direction for operating said control element between off and full on positions and for adjusting the temperature to be maintained by said thermostatically actuated valve from a higher to a lower value in a range having its higher temperature value adjacent the full on position, means for preventing movement of said control element beyond full on position, and selectively disengageable clutch means interconnecting said manually operable means and control element.

5. A thermostatic gas valve including a rotatable gas flow controlling control element, a thermostatically actuated valve, said element and valve being serially connected for gas flow and the valve being downstream of the element, means for adjusting the setting of said valve, means including manually operable means movable in a predetermined direction for operating said control element between off and full on positions and for adjusting the temperature to be maintained by said thermostatically actuated valve from a higher to a lower value in a range having its higher temperature value adjacent the full on position, means for preventing movement of said control element beyond full on position, selectively disengageable clutch means interconnecting said manually operable means and control element, and means associated with said manually operable means for returning said control element toward its off position independently of said clutch means.

6. A gas valve, including in combination, a rotor valve disc, a housing around said disc and having an axially flanged aperture located coaxially of the disc, a valve stem extending into said housing through said aperture and rotatably and axially movable therein, a drive washer fixedly secured to the inner end of said stem inside said housing, a drive yoke having axially projecting finger means drivingly connected to said disc and an apertured central portion encircling said stem between said housing and drive washer, said stem being axially and rotatably movable relative to said central portion, and normally engaged drive means on said drive washer and central portion of said yoke adapted to be disengaged upon axial movement of said stem.

7. A gas valve, including in combination, a rotor valve disc, a housing around said disc and having an axially flanged aperture located coaxially of the disc, a valve stem extending into said housing through said aperture and rotatably and axially movable therein, a drive washer fixedly secured to the inner end of said stem inside said housing, a drive yoke having axially projecting finger means drivingly connected to said disc and an apertured central portion encircling said stem between said housing and drive washer, said stem being axially and rotatably movable relative to said central portion, normally engaged drive means on said drive washer and central portion of said yoke adapted to be disengaged upon axial movement of said stem, and said housing having detent means engageable by the drive yoke for limiting rotation of said valve disc.

8. A thermostatic gas valve, including in combination, a rotor valve disc, a housing around said disc and having an axially flanged aperture located coaxially of the disc, a valve stem extending into said housing through said aperture and rotatably and axially movable therein, a drive washer fixedly secured to the inner end of said stem inside said housing, a drive yoke having axially projecting finger means drivingly connected to said disc and an apertured central portion encircling said stem between said housing and drive washer, said stem being axially and rotatably movable relative to said central portion, normally engaged drive means on said drive washer and central portion of said yoke adapted to be disengaged upon axial movement of said stem, said housing having detent means engageable by said yoke for limiting rotation of said valve disc, a thermostatically actuated valve disposed in series with and downstream of said rotor valve disc, and temperature adjusting means for said valve connected to said valve stem.

9. A gas valve, including in combination, a rotor valve disc, a housing around said disc and having an aperture located coaxially of the disc, a valve stem extending into said housing through said aperture and rotatably and axially movable therein, a drive washer connected to said stem inside said housing, a drive yoke drivingly connected to said disc and having a central portion, said stem being axially and rotatably movable relative to said central portion, and normally engaged drive means on said drive washer and central portion of said yoke adapted to be disengaged upon axial movement of said stem.

10. A gas valve, including in combination, a rotor valve disc, a housing around said disc and having an aperture located coaxially of the disc, a valve stem extending into said housing through said aperture and rotatably and axially movable therein, a drive washer connected to said stem inside said housing, a drive yoke drivingly connected to said disc and having a central portion, said stem being axially and rotatably movable relative to said central portion, normally engaged drive means on said drive washer and central portion of said yoke adapted to be disengaged upon axial movement of said stem, and means on said housing limiting rotation of said disc.

11. A gas valve, including in combination, a rotor valve disc, a housing around said disc and having an aperture located coaxially of the disc, a valve stem extending into said housing through said aperture and rotatably and axially movable therein, a drive washer connected to said stem inside said housing, a drive yoke drivingly connected to said disc and having a central portion adjacent said washer, said stem being axially and rotatably movable relative to said central portion, normally engaged drive means on said drive washer and central portion of said yoke adapted to be disengaged upon axial movement of said stem whereby said stem can be rotated independently of said disc, means on said housing limiting rotation of said disc, and means on said washer for moving said disc in one direction when said drive means is disengaged.

12. A gas valve, including in combination, a rotor valve disc, a housing around said disc and having an aperture located coaxially of the disc, a valve stem extending into said housing through said aperture and rotatably and axially movable therein, a drive washer connected to said stem inside said housing, a drive yoke drivingly connected to said disc and having a central portion adjacent said washer, said stem being axially and rotatably movable relative to said central portion, normally engaged drive means on said drive washer and central portion of said yoke adapted to be disengaged upon axial movement of said stem whereby said stem can be rotated independently of said disc, means for limiting rotation of said yoke and said drive washer, and means on said washer for moving said disc in one direction when said drive means is disengaged.

13. A gas valve including a valve body having a planar face with angularly spaced apart inlet and outlet passageways thereon, a rotatable centrally apertured valve disc having a planar face abutting the valve body face and having an arcuate recess therein cooperatively associated with said inlet and outlet passageways and rotatable from an off position to a full position and adapted to supply an increasing amount of gas from the inlet to the outlet when so rotated, said valve body including a thermostatic valve effectively at the outlet from said rotor disc for controlling the flow of gas flowing through the valve disc, means for adjusting the setting of said thermostatic valve including a rotatable and axially movable adjusting shaft in said body and projecting through the central opening in said disc, a housing surrounding said valve disc and having a front centrally apertured portion spaced somewhat from the valve disc, a valve stem mounted for rotary and axial movement in said housing and having a splined connection to said adjusting shaft, a drive washer connected to the inner end of said stem, spring means between said washer and valve disc, a disc drive yoke having a central portion between the drive washer and front of said housing and axially extending generally diametrically opposed drive fingers extending into driving relation with the valve disc, the drive washer and central portion of the yoke having normally engaged driving connections which are adapted to be disengaged upon axial movement of the stem against the force of said spring, means including an inwardly extending projection on the housing engageable with said drive fingers for determining the off and full on positions of the valve disc, said drive washer having radial projecting structure also engageable with said inwardly extending projection to determine the limits of movement of said valve stem, said valve disc being movable about 135 degrees and the valve stem being movable about 270 degrees, said drive washer having structure engageable with the drive yoke to return the valve disc toward its off position independently of the disengageable drive connection, and the inlet and outlet passageways in the valve body and the recess in the rotor valve disc and the connection between the valve stem and thermostatic adjusting shaft being such that the valve stem and disc are rotatable in a direction from off toward full on through a first range of movement to increase the flow of gas to a desired flame setting and the valve stem is thereafter movable in the same direction through a second range independently of the disc to decrease the temperature setting of the thermostatic valve.

14. A thermostatic gas valve including a rotatable gas flow controlling control element movable in a range between off and full on positions, a thermostatically actuated valve at the output side of said element, adjustable means for adjusting the temperature setting of said valve, means including manually movable means for operating said control element between off and full on positions and for adjusting the temperature to be maintained by said thermostatically actuated valve, disengageable clutch means interconnecting said manually operable means and control element and disengageable at least over a major portion of said range, and friction means to minimize movement of said control element by adjustment of said temperature adjusting means.

15. A thermostatic gas valve including a rotatable disc type gas flow controlling control element movable in a range between off and full on positions, a thermostatically actuated valve at the output side of said element, adjustable means for adjusting the temperature setting of said valve, means including manually rotatable means movable for rotating said control element between off and full on positions and for adjusting the temperature to be maintained by said thermostatically actuated valve, disengageable clutch means interconnecting said manually operable means and control element and disengageable at least over a major portion of said range and friction means acting on the periphery of said control element for minimizing movement of said control element by adjustment of said temperature adjusting means.

16. A thermostatic gas valve including a rotatable disc type gas flow controlling control element movable in a range between off and full on positions, a housing surrounding at least the periphery of said element, a thermostatically actuated valve at the output side of said element, adjustable means for adjusting the temperature setting of said valve, means including manually rotatable means movable in a predetermined direction for operating said control element betwen off and full on positions and for adjusting the temperature to be maintained by said thermostatically actuated valve, disengageable clutch means interconnecting said manually operable means and control element and disengageable at least over a major portion of said range, and friction means including opposed tongue-like portions of said housing bearing on the periphery of said control element for minimizing movement of said control element by adjustment of said temperature adjusting means.

References Cited in the file of this patent
UNITED STATES PATENTS

| | | |
|---|---|---|
| 1,977,552 | Grayson et al. | Oct. 16, 1934 |
| 2,765,809 | Lamar | Oct. 9, 1956 |
| 2,826,368 | Winslow | Mar. 11, 1958 |